United States Patent

[11] 3,582,828

[72] Inventor Milton H. Brockman Glendale, Calif.
[21] Appl. No. 744,522
[22] Filed July 12, 1968
[45] Patented June 1, 1971
[73] Assignee California Institute of Technology Pasadena, Calif.

[54] CHARGE STORAGE DIODE MODULATORS AND DEMODULATORS

3 Claims, 14 Drawing Figs.

[52] U.S. Cl. .......... 332/16, 307/232, 307/238, 307/280, 329/119, 329/205, 332/30, 332/52
[51] Int. Cl. .......... H03c 3/22
[50] Field of Search .......... 332/31, 30 (V), 52, 16; 329/119, 205; 307/232, 319, 281, 280, 300, 238

[56] References Cited

UNITED STATES PATENTS

| | | | |
|---|---|---|---|
| 2,981,881 | 4/1961 | Abbott et al. | 307/281X |
| 3,200,267 | 8/1965 | Cubert | 307/319(UX) |
| 3,249,772 | 5/1966 | Burns et al. | 307/281X |
| 3,292,006 | 12/1966 | Candy et al. | 307/319X |

OTHER REFERENCES

Moll et al. - " P-N Junction Charge Storage Diodes" Jan. 1962 pp. 43— 51 - Proceeding of the IRE 307— 319

*Primary Examiner*—Alfred L. Brody
*Attorneys*—Samuel Lindenberg and Arthur Freilich & Wasserman

ABSTRACT: Circuits for the modulation or demodulation of radio frequency signals comprising a charge storage diode which can provide a reverse current with a current-time integral equal to that of a forward current which has previously passed through the diode. In the modulator circuit, the carrier signal is coupled to pass through the diode, while the modulating signal (which varies in amplitude) biases the diode to govern the phase at which it conducts. The diode output is phase- and amplitude-modulated, but has no DC component. In the demodulator circuit, a constant radio frequency signal is coupled to pass through the diode, while the signal to be phase-demodulated biases the diode to govern the phase at which it conducts. This produces an amplitude-modulated output having no DC component.

*INVENTOR.*
MILTON H. BROCKMAN
*BY* Lindenberg & Freilich
ATTORNEYS

INVENTOR.
MILTON H. BROCKMAN

BY Lindenberg & Freilich

ATTORNEYS

INVENTOR.
MILTON H. BROCKMAN
BY
Lindenberg & Freilich
ATTORNEYS

INVENTOR.
MILTON H. BROCKMAN
BY Lindenberg & Freilich
ATTORNEYS

CHARGE STORAGE DIODE MODULATORS AND DEMODULATORS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to modulator and demodulator apparatus.

2. Description of the Prior Art

The modulation of carrier waves can be accomplished by a number of devices. Many of them utilize a tuned circuit, whose tuned frequency is varied by the modulating signal. While such devices are often efficient, their modulation bandwidth is limited by the difficulty of greatly varying the resonant frequency. Another type of modulator circuit utilizes a resistance diode for passing the carrier waves, the diode being biased by a modulation signal to vary the phase at which it becomes conducting. However, such resistance diode circuits generally pass portions of only one polarity of the carrier signal. As a result, efficiency is low and the one polarity output has an appreciable DC component which makes its further processing difficult. Furthermore, resistance diodes currently available generally have a forward resistance of several hundred ohms, necessitating a modulation input with large resistance. The large resistances increase the effects of internal stray capacitances and limit the frequency of operation.

The demodulation of signals can be accomplished using many of the same types of devices utilized for modulation. However, similar disadvantages such as low bandwidth and the generation of signals with large DC components are also present.

OBJECTS AND SUMMARY OF THE INVENTION

One object of the present invention is to provide modulator and demodulator apparatus of high efficiency, wide modulation bandwidth capability, and simple design.

Another object is to provide modulator and demodulator apparatus which generates an output having no appreciable DC component.

In accordance with the present invention circuits are provided for the modulation and demodulation of radiofrequency signals. The circuits utilize charge storage diodes or the like, which are biased by an information signal that governs the angle during each cycle when the diodes begin to conduct current in the forward direction. Charge storage diode type devices are characterized by the fact that, after carrying a forward current during the first part of each cycle, they can carry a reverse current having a current-time integral equal to that of the forward current. As a result, the diode output has no appreciable DC component, which facilitates further signal processing. Also, the fact that there is both a forward and reverse current flow for each cycle enables high efficiency, as compared with simple resistance diode devices. The charge storage diode also permits large bandwidths of modulation, and is simple and compact.

In one embodiment of the invention, a modulator circuit is provided which employs a charge storage diode for passing a radiofrequency carrier wave. The diode is biased by the sum of a DC signal and a modulating input. The DC bias limits forward diode conduction of the carrier signal to a period less than 180° even for a zero modulating signal. The modulating signal varies the diode conduction time for each cycle to a period that is more or less than that produced by only the DC bias. In one circuit with a positive DC bias, a large negative modulating signal reduces total bias to a small positive value. As a result, the diode conducts in a forward direction during a large part of the positive carrier half cycle, and the diode output has a large amplitude. (There is an equal negative signal for each positive diode output). If the modulating signal becomes positive, the diode conducts for only a small portion of every cycle. The diode output is both amplitude- and phase-modulated. If only phase modulation is desired, the diode output is coupled to a saturable amplifier and the saturable amplifier output is filtered.

In another embodiment of the invention, a demodulator circuit is provided for phase-modulated signals. The circuit comprises a charge storage diode connected to pass a constant radiofrequency signal. The diode is biased by an RF signal to be demodulated plus a DC bias source. The diode conducts a forward current during the portion of each cycle when the constant frequency signal exceeds the signal to be demodulated plus the DC bias. After each forward current conduction, the diode conducts a reverse current of equal current-time integral. The diode output is a pure AC signal with an average amplitude for each cycle dependent upon the level of phase modulation of the signal being demodulated. The diode output may be passed through a low-pass filter to derive a signal with an amplitude proportional to the phase modulation of the signal being demodulated.

The charge storage diode enables modulation with wide bandwidths, such as modulating frequencies from DC up to those which nearly equal the carrier frequency. This is larger than can generally be obtained with the usual tuned circuit modulators. Charge storage diodes typically have low forward resistances, such as 10 ohms, which are substantially lower than typical resistance diodes which are usable at high radio frequencies, these latter diodes having resistances on the order of 200 ohms. The lower forward resistance enables matching with circuits of lower impedance, thereby reducing capacitance effects and enabling operation at higher frequencies. The charge storage diode outputs which have both positive and negative current pulses for each cycle have a high efficiency, and facilitate further processing because of the absence of DC components.

The novel feature of the invention are set forth with particularity in the appended claims. The invention will best be understood from the following description when read in conjunction with the accompanying drawings.

DESCRIPTION OF THE PREFERRED EMBODIMENTS

Figure 1:
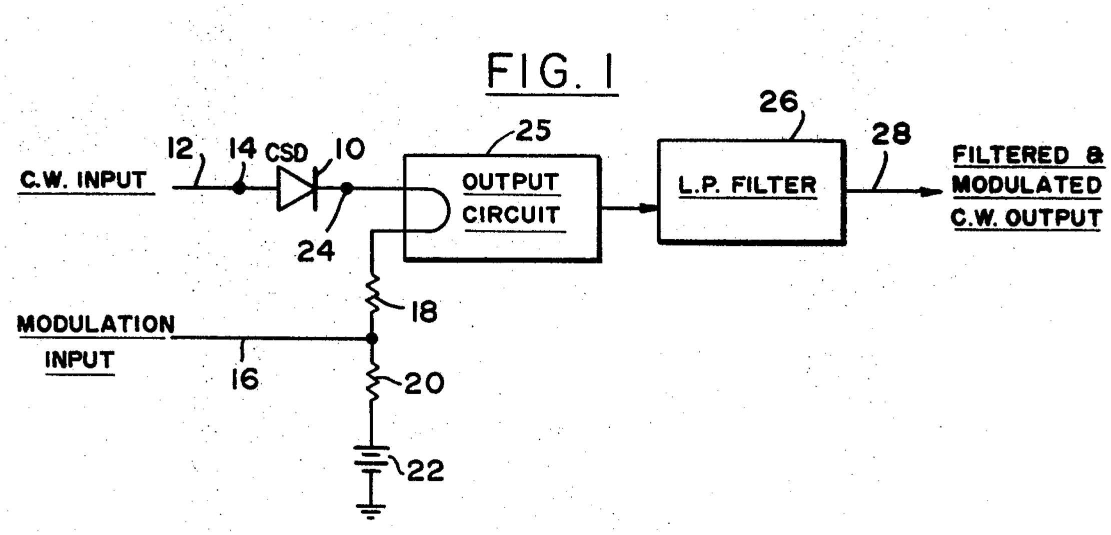
FIG. 1 is a simplified schematic diagram of a modulator circuit constructed in accordance with the invention.

FIG. 1 is a simplified diagram of a modulator constructed in accordance with the invention, which utilizes a charge storage diode 10. A carrier wave signal to be modulated is coupled through line 12 to the positive or anode terminal 14 of the diode. A modulation signal for modulating the carrier wave input is received over a line 16. The modulation input is coupled to a biasing network comprising resistors 18 and 20 and a DC source 22. The resistors and DC source are coupled between the negative or cathode terminal 24 of the charge storage diode and ground. The modulation input at 16 is coupled to a point between the resistors. The voltage appearing at the cathode terminal 24 of the diode includes a signal of the carrier wave frequency of the signal received at 12 modulated by the modulation input received at 16, plus harmonics of the carrier frequency. The currents passing through the charge storage diode are coupled through an output circuit 25 to a low-pass filter 26. The filter 26 prevents the passage of harmonics of the carrier frequency. The signal on the output line 28 from the filter comprises the carrier wave, modulated in both amplitude and phase in accordance with variations in amplitude of the modulation input at 16.

The operation of the circuit of FIG. 1 is based upon the characteristics of charge storage diodes and devices which operate in a similar manner. A charge storage diode is characterized by the storage of minority carriers at the diode junction when the diode is conducting in the forward direction, i.e., when the voltage at the anode 14 is higher than the voltage at the cathode 24. During a subsequent period of an AC waveform, when a reverse voltage is applied, i.e., when the voltage at cathode 24 is above the voltage at the anode 14, the stored minority carrier charge is released. The release of the stored minority carriers results in the flow of a reverse current through the diode. For a properly chosen charge storage diode, the current-time integral during conduction in the forward direction is equal to the current-time integral in the reverse direction. As a result, the diode output has no DC components.

Figure 2A:
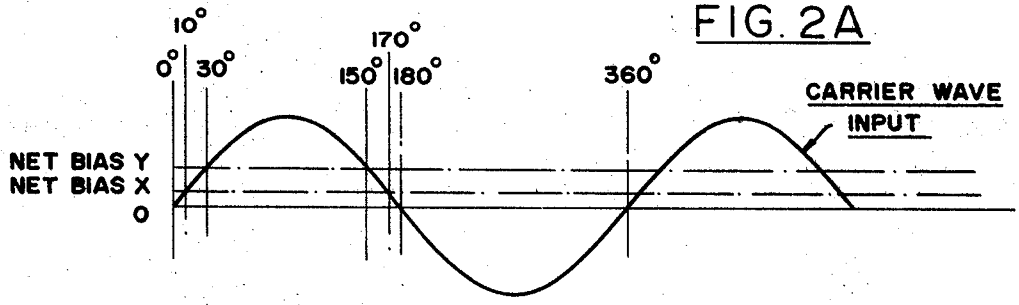
FIGS. 2A, 2B and 2C illustrate the waveforms of signals in the circuit of FIG. 1.

FIG. 2A illustrates the waveform of the carrier wave with respect to two net voltage bias levels X and Y, that appear at the cathode terminal 24 in FIG. 1. The net bias levels X and Y represent the sum of the DC bias source 22 and the modulation signal at 16, at a given time. Typically, the portion of the voltage attributable to the modulation signal varies, although it varies at a rate slower than the frequency of the carrier wave. It can been seen in FIG. 2A that the carrier wave voltage exceeds the bias X only during the 10° to 170° period of every cycle of the carrier waves. Therefore, a net bias of level X results in a forward current through the diode during a period 10° to 170°. In a similar manner, it can be seen that the carrier wave exceeds the net bias level Y only during the period 30° to 150°, and therefore the diode conducts in a forward direction only during this period.

Figure 2B:
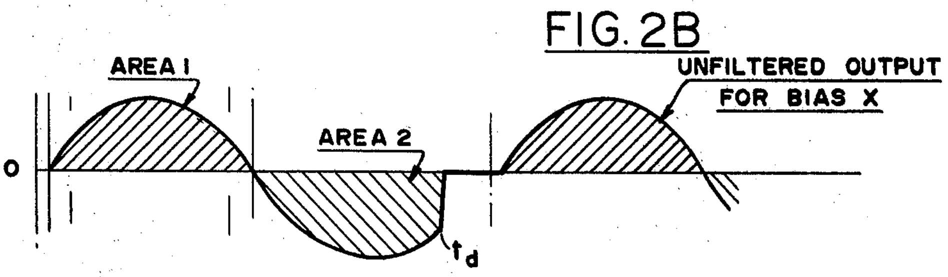

FIG. 2B shows the current flowing through the diode for a net bias of level X. Forward currents flow through the diode only when the carrier wave voltage exceeds the net bias voltage, which occurs only during the 10° to 170° period. During this flow, the current-time integral is as shown by area 1. During the forward current flow through the diode, a stored minority carrier charge is built up which is equal to the integral of area 1. At the 170° point, the carrier wave input is less than the net bias, so that a reverse bias is applied to the diode. Thereafter, the stored minority carrier charge is released to provide a reverse current. As a result, a reverse current flows through the charge storage diode. The reverse current continues until the minority carrier charge is depleted, which is when the reverse current-time integral represented by area 2 equals area 1. This occurs at the time $t_d$, and at this point an abrupt transition occurs from reverse current flow to cutoff. No further current flows through the diode until the next 10° point when the carrier wave again exceeds the net bias X.

Figure 2C:
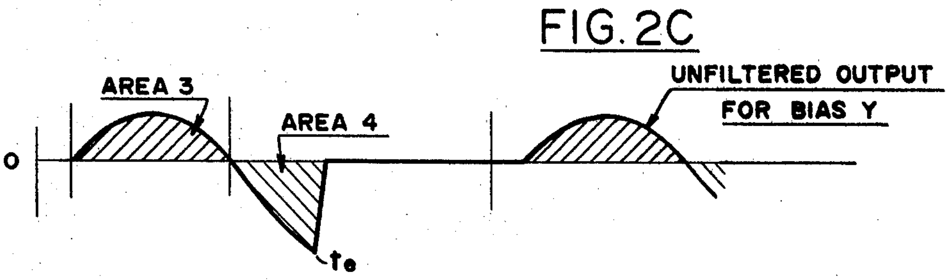

FIG. 2C illustrates the case where the net bias has increased to the level Y, wherein the net bias equals the carrier wave 30° after the carrier wave becomes positive. For a constant DC bias source, the increase in net bias would be attributable to a change in the voltage of the modulation signal. As shown in FIG. 2C, a forward diode current lasts only during the period 30° to 150° of each cycle of the carrier wave. The corresponding current-time integral is represented by area 3, which also represents the stored minority carrier charge. During the period after the 150° point, when the diode is reverse biased, a reverse current flows through the diode until a point $t_r$ is reached, when the reverse current abruptly falls to zero. The reverse current-time integral represented by area 4 is equal to the integral represented by area 3.

It can be seen from FIGS. 2B and 2C that variation in the net bias of the diode varies the current flowing through the diode at each cycle. For variations between approximately 0° and 30° when the carrier wave is almost linear, the variation in the current-time integral is almost proportional to the level of the net bias. The waveforms of the forward and reverse currents have different shapes, particularly at the point where the reverse current is abruptly cut off. As a result, large second and higher harmonics of the carrier wave frequency are created. These can be removed by simple filtering of the diode output.

In the design of charge storage devices in accordance with the present invention, care must be taken to use diodes with sufficiently long carrier lifetimes. The lifetime of the minority carriers is typically very short, and this may result in appreciable decay in the stored charge before the reverse current integral equals the forward current integral. If the decay is appreciable, the diode output will contain a DC component. It is generally preferable that the charge storage device have a minority carrier lifetime longer than the duration of one-half cycle of the carrier wave. For a lifetime of minority carriers substantially greater than one-half cycle of the carrier wave, the forward and reverse current-time integrals will be approximately equal. This will result in a maximum efficiency and substantially no DC output.

The use of the charge storage diode modulator provides a high efficiency, since there are both positive and negative currents for each cycle of modulation. This can be compared with prior art resistance diode modulators wherein an output is generated for a portion of only one-half of each cycle. In addition to the higher efficiency, the present modulator provides an output with smaller second and higher order harmonics and substantially smaller DC level, thereby facilitating further processing. The modulation can be performed over a large bandwidth, and provides high efficiency with a simple circuit.

The output waveforms shown in FIGS. 2B and 2C are modulated in both amplitude and phase. Thus, a large net bias not only limits the output amplitude, but delays the beginning of the wave. If it is desired to obtain a phase modulated output, the output of the diode can be coupled to a limiter circuit, which limits the voltage or current amplitude. The output of such a limiter, after filtering, is a carrier wave of constant amplitude, whose phase varies in accordance with the amplitude of the modulating signal.

Figure 3:
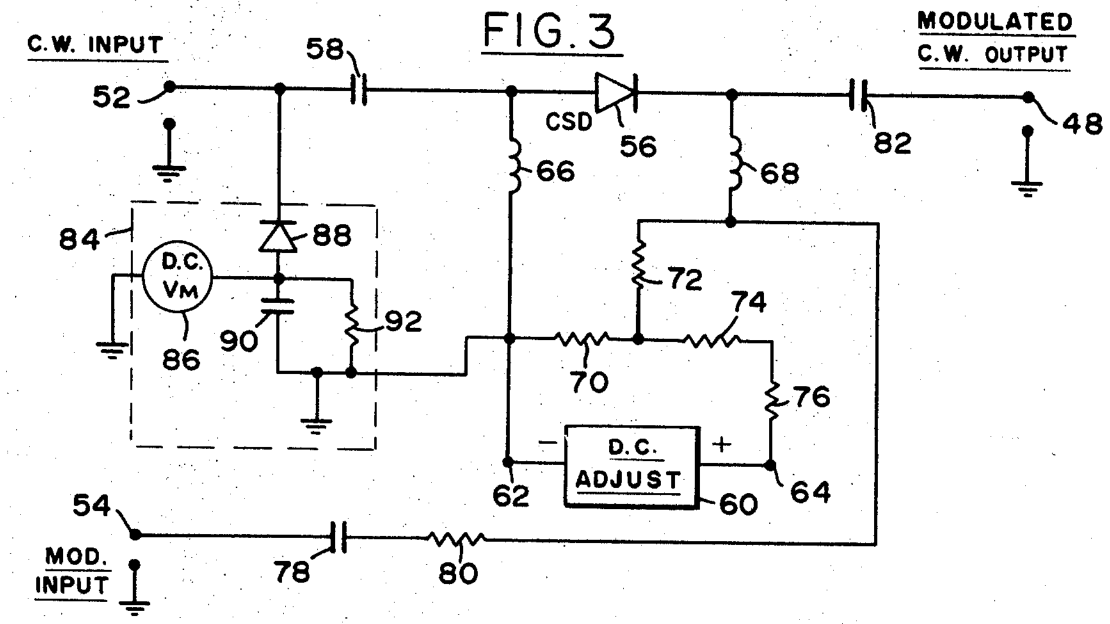
FIG. 3 is a schematic diagram of a modulator circuit constructed in accordance with the invention, employing a single charge storage diode.

FIG. 3 is a detailed schematic diagram of a circuit for producing a modulated carrier wave output at 48, the output signal containing a carrier wave input at 52 modulated by a modulation input received at 54. The circuit comprises a charge storage diode 56 having an anode side coupled through a capacitor 58 to the carrier wave input terminal 52. A DC bias is applied by an adjustable DC source 60 having a negative terminal 62 and positive terminal 64. A connecting network comprising a pair of inductors 66 and 68 and four resistors 70, 72, 74, and 76 couple the DC supply to the charge storage diode 56 to establish an average bias or operating point. The modulation input terminal 54 is coupled through a capacitor 78 and resistor 80 to the side of the inductor 68 opposite the cathode terminal of the charge storage diode. A coupling capacitor 82 couples the output of the diode to the output terminal 48. The circuit also includes a volt meter circuit 84 for measuring the peak values of the carrier wave input, comprising a DC volt meter 86 coupled to a network including a diode 88, capacitor 90 and resistor 92. The circuit 84 can be replaced by a VTVM or the like if connected as shown.

A circuit has been constructed in accordance with the diagram of FIG. 3, using the component values shown in Table I. The circuit was used to modulate a carrier wave of 66 MHz. of an amplitude of 6 volts peak-to-peak from a 50 ohm source. The output terminal 48 was coupled to circuitry with an input impedance of 50 ohms, the output at 48 also being coupled to apparatus for displaying the output waveform. The circuit was found to provide a modulated output having the characteristics described above in connection with FIG. 1.

TABLE I

| COMPONENT | CHARACTERISTIC |
|---|---|
| 56 | Hewlett-Packard type HPA0103 charge storage diode |
| 88 | 88 VHF resistance diode |
| 58 | 0.0082 microfarads |
| 82 | 0.0082 microfarads |
| 78 | 10 microfarads |
| 90 | 0.001 microfarads |
| 66 | 1 microhenry |
| 68 | 1 microhenry |
| 70 | 10 ohms |
| 72 | 10 ohms |
| 74 | 100 ohms |
| 76 | 100 ohms |
| 80 | 20 ohms |
| 92 | 10k ohms |
| 60 | DC supply adjustable between 0 and 14.3 volts |

Figure 4:
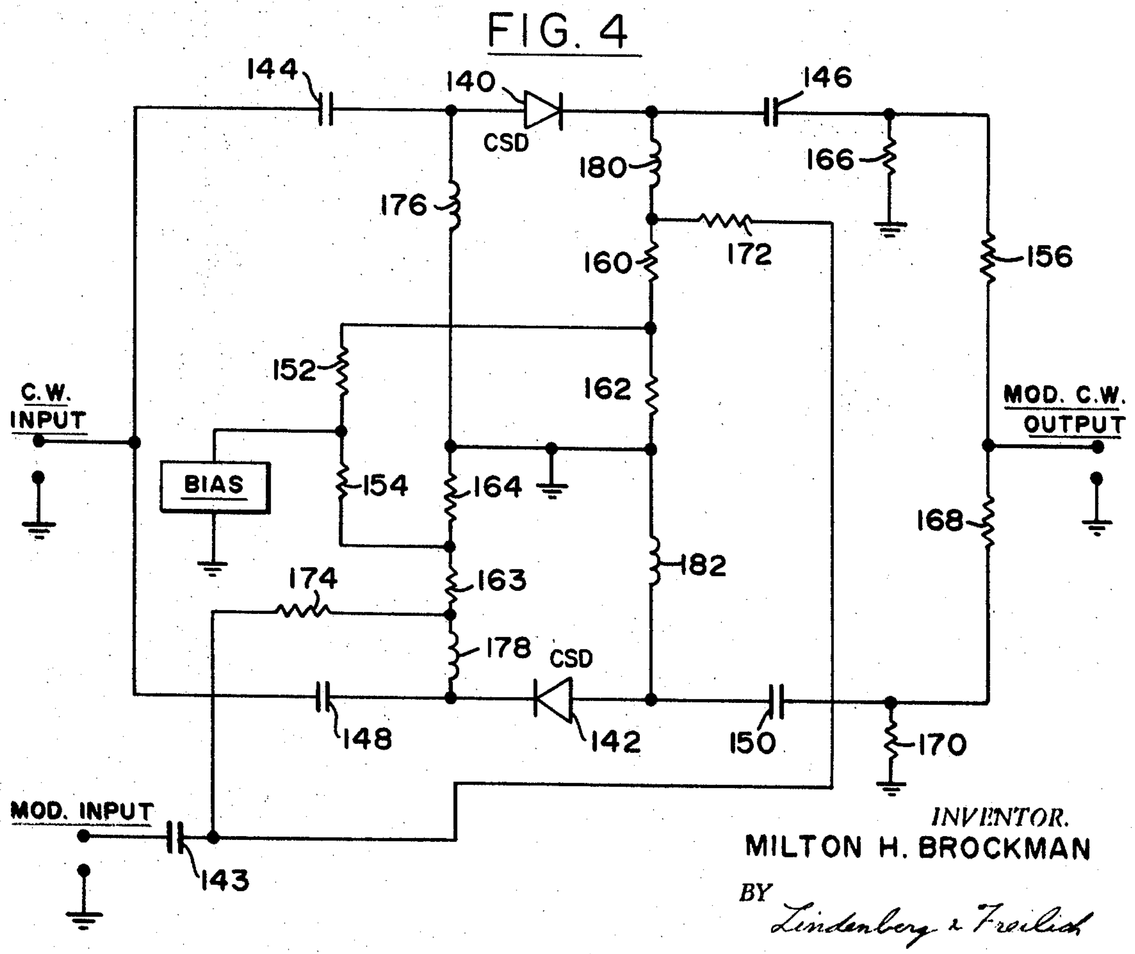
FIG. 4 is a schematic diagram of a modulator circuit constructed in accordance with the invention, employing two charge storage diodes.

FIG. 4 illustrates another circuit constructed in accordance with the invention which utilizes two charge storage diodes. A circuit has been constructed in accordance with this circuit for use with a carrier wave of 66 MHz., using the component values shown in Table II.

TABLE II

| COMPONENT | CHARACTERISTIC |
|---|---|
| 140 | HPA0103 charge storage diode |
| 142 | HPA0103 charge storage diode |
| 143 | 10 microfarads |
| 144 | 200 picofarads |
| 146 | 200 picofarads |
| 148 | 200 picofarads |
| 150 | 200 picofarads |
| 152 | 50 ohms |
| 154 | 50 ohms |
| 156 | 50 ohms |
| 160 | 10 ohms |
| 162 | 10 ohms |
| 163 | 10 ohms |
| 164 | 10 ohms |
| 166 | 150 ohms |
| 168 | 50 ohms |
| 170 | 150 ohms |
| 172 | 20 ohms |
| 174 | 20 ohms |
| 176 | 1 microhenry |
| 178 | 1 microhenry |
| 180 | 1 microhenry |
| 182 | 1 microhenry |

Figures 5A, 5B, 5C:
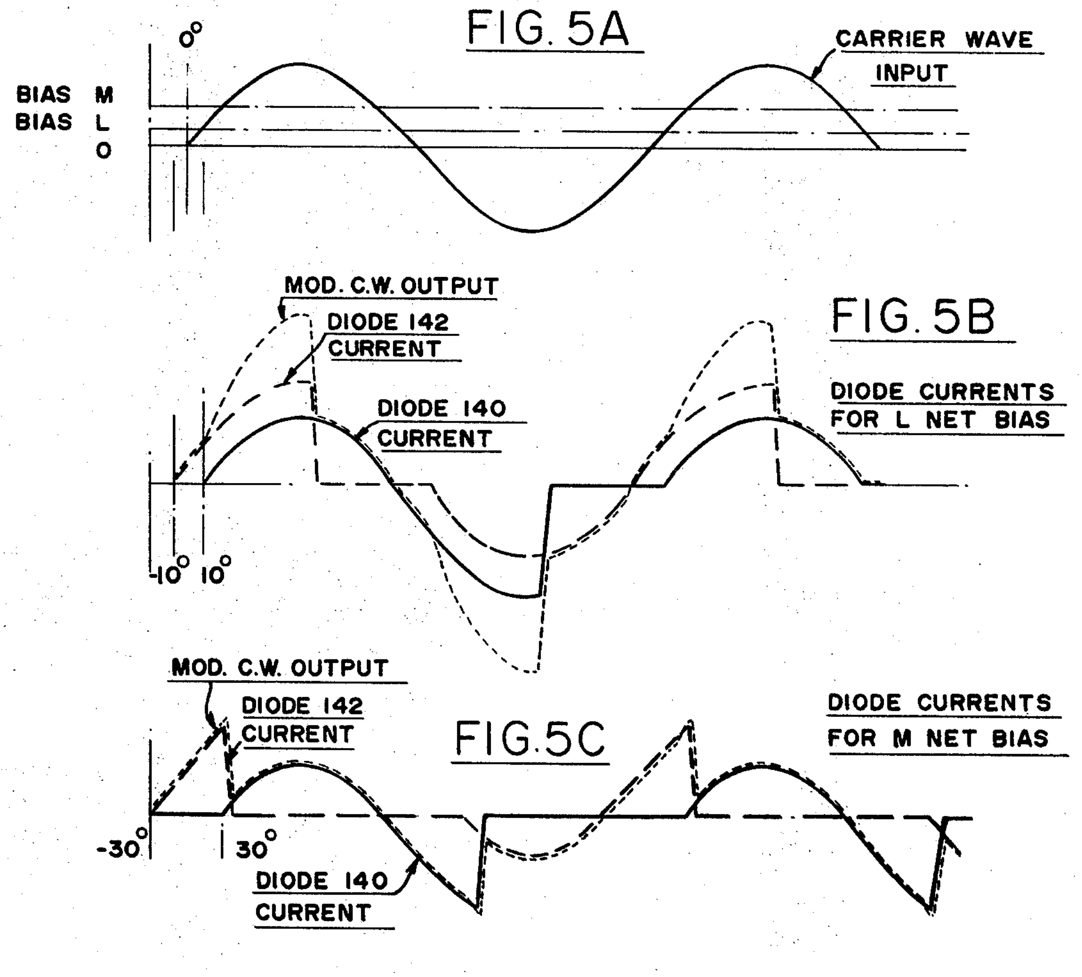
FIGS. 5A, 5B and 5C are illustrations of the waveforms of signals in the circuit of FIG. 4.

A carrier wave input for the circuit of FIG. 4 is shown in FIG. 5A while the diode currents and outputs have the waveforms shown in FIGS. 5B and 5C for net bias levels of L and M, respectively. Each bias level represents the sum of a DC bias plus the voltage of the modulating signal. As the net bias increases from the level L shown in FIG. 5B to a level M shown in FIG. 5C, the phase of the output signal is advanced by a larger portion of a cycle of the carrier wave. However, the amplitude of the output signals of approximately carrier wave frequency changes by a much smaller proportion. Accordingly, the two diode circuit of FIG. 4 generates an output which is primarily phase-modulated but only slightly amplitude-modulated by the amplitude of the modulating signal. Therefore, where only phase modulation is desired, relatively small amplitude limiting of the output of the circuit of FIG. 4 is required.

Figure 6:
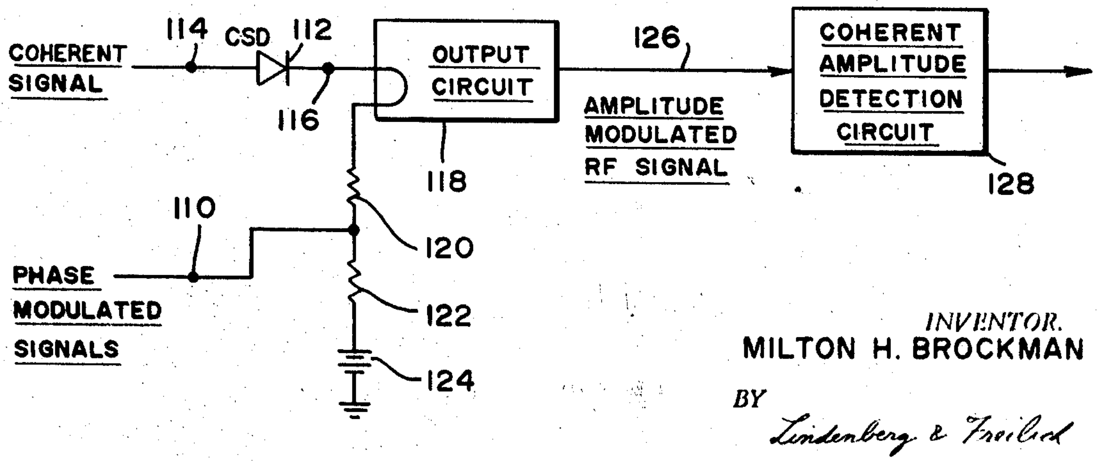
FIG. 6 is a simplified schematic diagram of a demodulator circuit constructed in accordance with the invention.

FIG. 6 illustrates a circuit for demodulating a source of phase-modulated radiofrequency signals received at input terminal 110. The circuit comprises a charge storage diode 112 having an anode terminal 114 coupled to a source of a coherent signal, such as a carrier wave. The cathode terminal 116 of the diode is coupled to a biasing network comprising a pair of resistors 120 and 122 which are coupled to a source of DC voltage 124. The terminal between the resistors 120 and 122 is coupled to the input terminal 110 which receives the phase-modulated signals to be demodulated. The current flow through the diode 112 is amplitude-modulated in accordance with the phase of the signal received at 110. The amplitude-modulated signal is passed over line 126 to a coherent amplitude detection circuit 128. The detection circuit 128 may be any of a number of well known circuits for demodulating amplitude-modulated signals. The output of the detection circuit 128 is the modulating signal contained in the phase-modulated signal which was received at the input terminal 110.

Figure 7A:
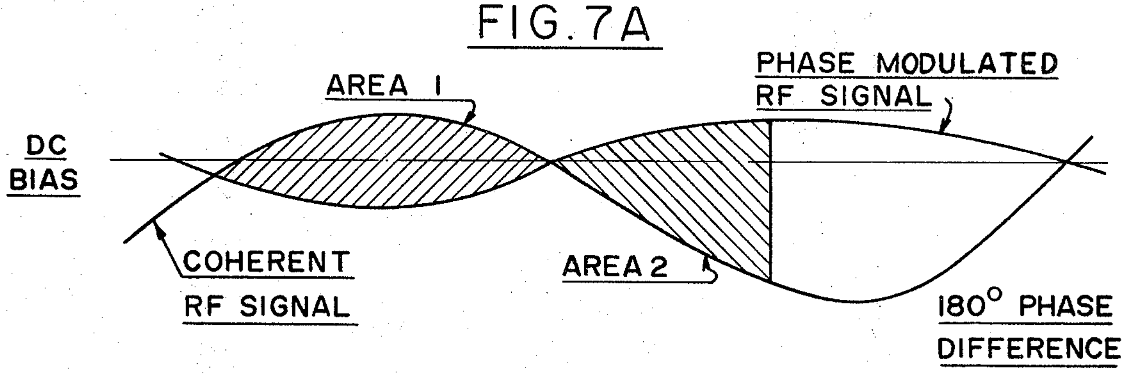
FIGS. 7A, 7B, and 7C illustrate the waveforms of signals in the circuit of FIG. 6.
Figure 7B:
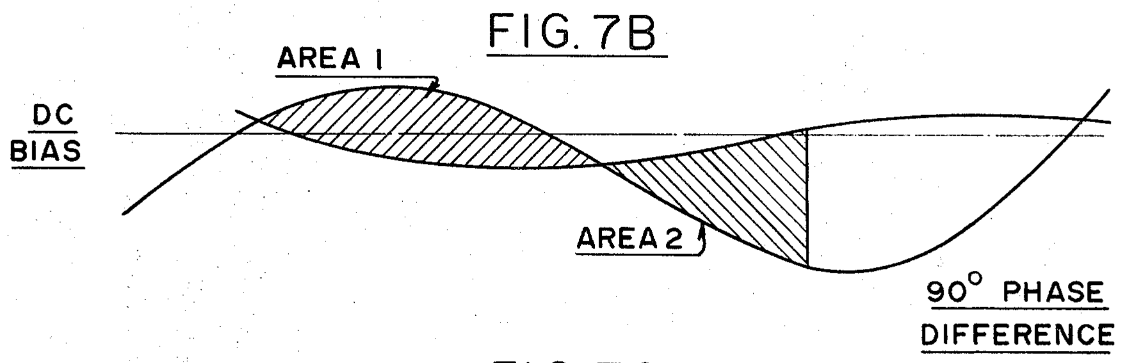
Figures 7C, 8:
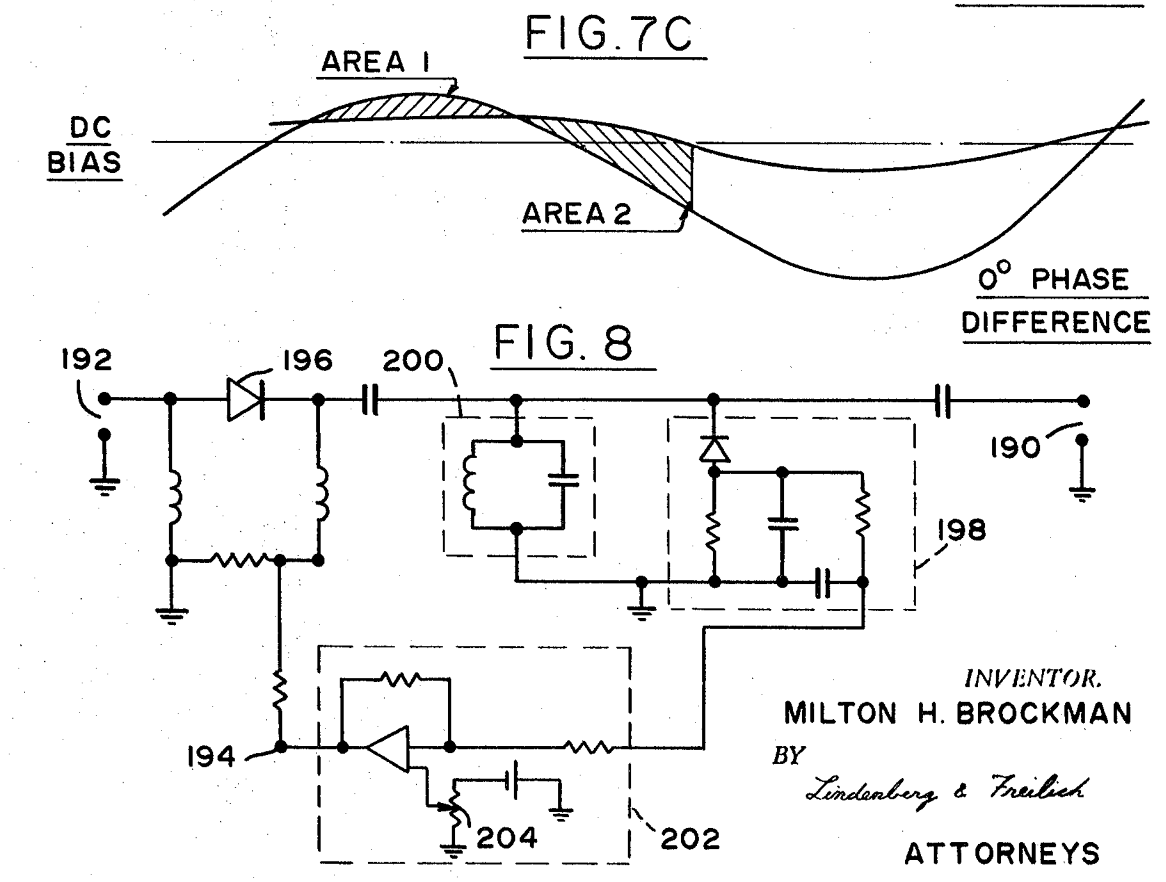
FIG. 8 is a schematic diagram of a modulator circuit which maintains a constant power output.

FIG. 7A, 7B, and 7C illustrate the waveforms created in the circuit of FIG. 6. In FIG. 7A, the phase-modulated signal is 180° out of phase with the coherent signal. The times of conduction of the charge storage diode are represented by the waveform portions which define area 1 and area 2. The areas 1 and 2 are equal, so that the output of the circuit has substantially no DC component. It can be seen from FIGS. 7A through 7C that the amplitude of the output, or charge storage diode current, varies in accordance with the phase difference between the phase-modulated and coherent signal inputs. It has been found that the phase demodulation process can be performed using even a zero bias, and that in such a case there is a small but appreciable gain in the power of the modulating signal.

The modulator and demodulator circuitry have a wide variety of applications. FIG. 8 illustrates a circuit for maintaining a constant power output at 190, for a carrier wave or other constant frequency input at 192 which may vary in amplitude. This is accomplished essentially by modulating the input by a DC information signal at 194 derived from the amplitude of the input and compared with a DC reference level at 204. The DC bias signal at 194 which biases a charge storage diode 196 is obtained by a peak detector 198. The detector detects the peak signal across a tuned circuit 200 which is tuned to the constant frequency signal at the input 192. The detected signal is amplified by a differential DC amplifier 202 relative to the DC reference level at 204. The output of the amplifier 202 is delivered to the bias point 194.

Although particular embodiments of the invention have been described and illustrated herein, it is recognized that modifications and variations may readily occur to those skilled in the art, and, consequently, it is intended that the claims be interpreted to cover such modifications and equivalents.

What I claim is:

1. Apparatus for modulating an alternating first signal with a second signal of lower frequency than said first signal comprising:

charge storage diode means for conducting a reverse current with a current-time integral substantially equal to the current-time integral of a forward current passing therethrough immediately prior thereto;

means for applying said alternating first signal to said diode means;

biasing means coupled to said diode means for reverse biasing it with said second signal so that a peak portion of said alternating first signal which is of a voltage exceeding said second signal passes through said diode in a forward direction, and a second portion of said first signal immediately following said peak portion passes through said diode in a reverse direction until the reverse current-time integral equals the forward current-time integral; and output means responsive to the flow of current through said diode means;

said diode means having a lifetime of minority carriers substantially greater than one-half the period of said first signal.

2. The apparatus described in claim 1 wherein:

said first signal comprises a substantially sinusoidal radiofrequency signal of predetermined amplitude; and including a source of direct current coupled to said biasing means to provide a constant bias component to said second signal ranging between zero and the amplitude of said radiofrequency signal when it is at 30° past its zero crossing, whereby to provide a substantially linear relationship between changes in bias and output.

3. The apparatus described in claim 1 wherein:

said means for applying a first signal is coupled to a first terminal of said diode means; and said biasing means comprises a source of direct current, first and second resistances connected in series between a second terminal of said diode means and said source of direct current, and means for applying an alternating current information signal to the junction of said first and second resistances.